United States Patent
Gamaley et al.

(10) Patent No.: US 8,825,735 B2
(45) Date of Patent: Sep. 2, 2014

(54) PUBLIC BOT MANAGEMENT IN PRIVATE NETWORKS

(75) Inventors: Vladimir Gamaley, Haifa (IL); Hagit Hamdani, Haifa (IL); Dvir Landerer, Haifa (IL); Gabi Miro, Haifa (IL); Gili Nachum, Haifa (IL); Gil Perzy, Haifa (IL); Reuven Svechin, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/548,486

(22) Filed: Jul. 13, 2012

(65) Prior Publication Data

US 2012/0284323 A1 Nov. 8, 2012

Related U.S. Application Data

(63) Continuation of application No. 12/559,247, filed on Sep. 14, 2009, now Pat. No. 8,255,453.

(51) Int. Cl.
*G06F 15/16* (2006.01)
*H04L 29/06* (2006.01)

(52) U.S. Cl.
CPC ........ *H04L 63/0421* (2013.01); *H04L 63/0407* (2013.01)
USPC ............... 709/202; 709/206; 726/11; 726/12; 726/26

(58) Field of Classification Search
CPC ........................ H04L 63/0421; H04L 63/0407
USPC ................. 709/202, 204, 206; 726/11, 12, 26
See application file for complete search history.

(56) References Cited

U.S. PATENT DOCUMENTS

| | | | |
|---|---|---|---|
| 7,734,709 B2 | 6/2010 | Goodman et al. | |
| 8,301,701 B2 | 10/2012 | Goodman et al. | |
| 2001/0037316 A1 | 11/2001 | Shiloh | |
| 2003/0009523 A1* | 1/2003 | Lindskog et al. | ............. 709/205 |
| 2004/0019637 A1 | 1/2004 | Goodman et al. | |
| 2004/0019701 A1 | 1/2004 | McGee et al. | |
| 2004/0117444 A1 | 6/2004 | Goodman et al. | |
| 2004/0128353 A1 | 7/2004 | Goodman et al. | |

(Continued)

FOREIGN PATENT DOCUMENTS

| | | |
|---|---|---|
| CN | 1306431 A | 8/2001 |
| CN | 1482558 A | 3/2004 |

(Continued)

OTHER PUBLICATIONS

International Search Report and Written Opinion, PCT/EP2010/062352, Nov. 25, 2010, 11 pages.

(Continued)

*Primary Examiner* — David Lazaro
(74) *Attorney, Agent, or Firm* — Ingrid Foerster; Edell, Shapiro & Finnan, LLC

(57) ABSTRACT

A system for managing the use of BOTs by computer network users, the system including a gateway-to-BOT communications manager configured to relay communications to a BOT on behalf of a computer user in a manner that prevents the BOT from associating the communications with the computer user, and a gateway-to-user communications manager configured to relay the communications from the computer user to the gateway-to-BOT communications manager, and relay to the computer user communications received from the gateway-to-BOT communications manager that originate from the BOT.

15 Claims, 4 Drawing Sheets

(56) References Cited

U.S. PATENT DOCUMENTS

| | | |
|---|---|---|
| 2005/0250481 A1 | 11/2005 | Kiss et al. |
| 2006/0020658 A1 | 1/2006 | Goodman et al. |
| 2006/0031295 A1 | 2/2006 | Goodman et al. |
| 2006/0031533 A1 | 2/2006 | Goodman et al. |
| 2007/0019637 A1 | 1/2007 | Boyd et al. |
| 2007/0124270 A1 | 5/2007 | Page |
| 2007/0172063 A1 | 7/2007 | Biggs et al. |
| 2008/0155694 A1 | 6/2008 | Kwon et al. |
| 2009/0055485 A1 | 2/2009 | Tsai et al. |

FOREIGN PATENT DOCUMENTS

| | | |
|---|---|---|
| EP | 1594270 A1 | 11/2005 |
| JP | 2002135334 | 5/2002 |
| JP | 2005107893 | 4/2005 |
| JP | 2008262549 | 10/2008 |
| WO | 2008156342 | 12/2008 |

OTHER PUBLICATIONS

German Office Action dated Feb. 11, 2013, 9 pages.
Chinese Office Action dated Nov. 25, 2013, 7 pages.

* cited by examiner

PUBLIC BOT MANAGEMENT IN PRIVATE NETWORKS

CROSS-REFERENCE TO RELATED APPLICATIONS

This application is a continuation of U.S. patent application Ser. No. 12/559,247, entitled "Public BOT Management in Private Networks" and filed Sep. 14, 2009, the disclosure of which is incorporated herein by reference in its entirety.

FIELD OF THE INVENTION

The present invention relates to computer network management in general, and more particularly to managing the use of public BOTs by private computer network users.

BACKGROUND OF THE INVENTION

Company computer networks typically allow company computer users to access non-company networks, while enforcing strict security measures to prevent unauthorized access to company information from such non-company networks. However, maintaining such security measures is becoming increasingly challenging due to the increasing appetite of company employees for emerging information resources available from public information providers.

One method for accessing public information resources involves employing instant messaging (IM) robots (BOTs) that act as virtual users for supplying information to employees who subscribe to receive information from such resources. An employee may subscribe to receive presence information from a BOT by adding the BOT to the employee's IM software contact list, and thereafter may open a chat session with the BOT to query the BOT for information such as stock prices, language translations, weather reports, etc. In doing so, the employee typically provides his/her network address to the BOT. Unfortunately, public BOTs are often configured to store the addresses of users that use BOTs, thereafter initiating unwanted chat sessions with the users. Furthermore, where companies employ a centralized collaboration server(s) that acts as a gateway between employees and public BOTs, the server maintains a separate subscription for each employee that is subscribed the same BOT, placing a significant load on the collaboration server(s).

SUMMARY OF THE INVENTION

The present invention discloses systems and methods for managing the use of public BOTs by private computer network users.

In one aspect of the invention a system is provided for managing the use of BOTs by computer network users, the system including a gateway-to-BOT communications manager configured to relay communications to a BOT on behalf of a computer user in a manner that prevents the BOT from associating the communications with the computer user, and a gateway-to-user communications manager configured to relay the communications from the computer user to the gateway-to-BOT communications manager, and relay to the computer user communications received from the gateway-to-BOT communications manager that originate from the BOT.

In another aspect of the invention the gateway-to-BOT communications manager is configured to identify communications sent to the BOT as originating from a fictitious user being other than the computer user.

In another aspect of the invention the gateway-to-BOT communications manager is configured to send a subscription request on behalf of the user requesting that a subscription be established for presence information regarding the BOT.

In another aspect of the invention the gateway-to-BOT communications manager is configured to receive presence information regarding the BOT in connection with the subscription request, and the gateway-to-user communications manager is configured to relay the presence information to the user.

In another aspect of the invention a method is provided for managing the use of BOTs by computer network users, the method including a) relaying communications to a BOT on behalf of a computer user in a manner that prevents the BOT from associating the communications with the computer user, and b) relaying to the computer user communications that originate from the BOT.

In another aspect of the invention the relaying step a) includes identifying the communications sent to the BOT as originating from a fictitious user being other than the computer user.

In another aspect of the invention the relaying step a) includes sending a subscription request on behalf of the user requesting that a subscription be established for presence information regarding the BOT.

In another aspect of the invention the method further includes receiving presence information regarding the BOT in connection with the subscription request, and relaying the presence information to the user.

In another aspect of the invention a computer program product is provided for managing the use of BOTs by computer network users, the computer program product including a computer readable medium, and computer program instructions operative to relay communications to a BOT on behalf of a computer user in a manner that prevents the BOT from associating the communications with the computer user, and relay to the computer user communications that originate from the BOT, where the program instructions are stored on the computer readable medium.

BRIEF DESCRIPTION OF THE DRAWINGS

The invention will be understood and appreciated more fully from the following detailed description taken in conjunction with the appended drawings in which.

DETAILED DESCRIPTION OF THE INVENTION

Figure 1:
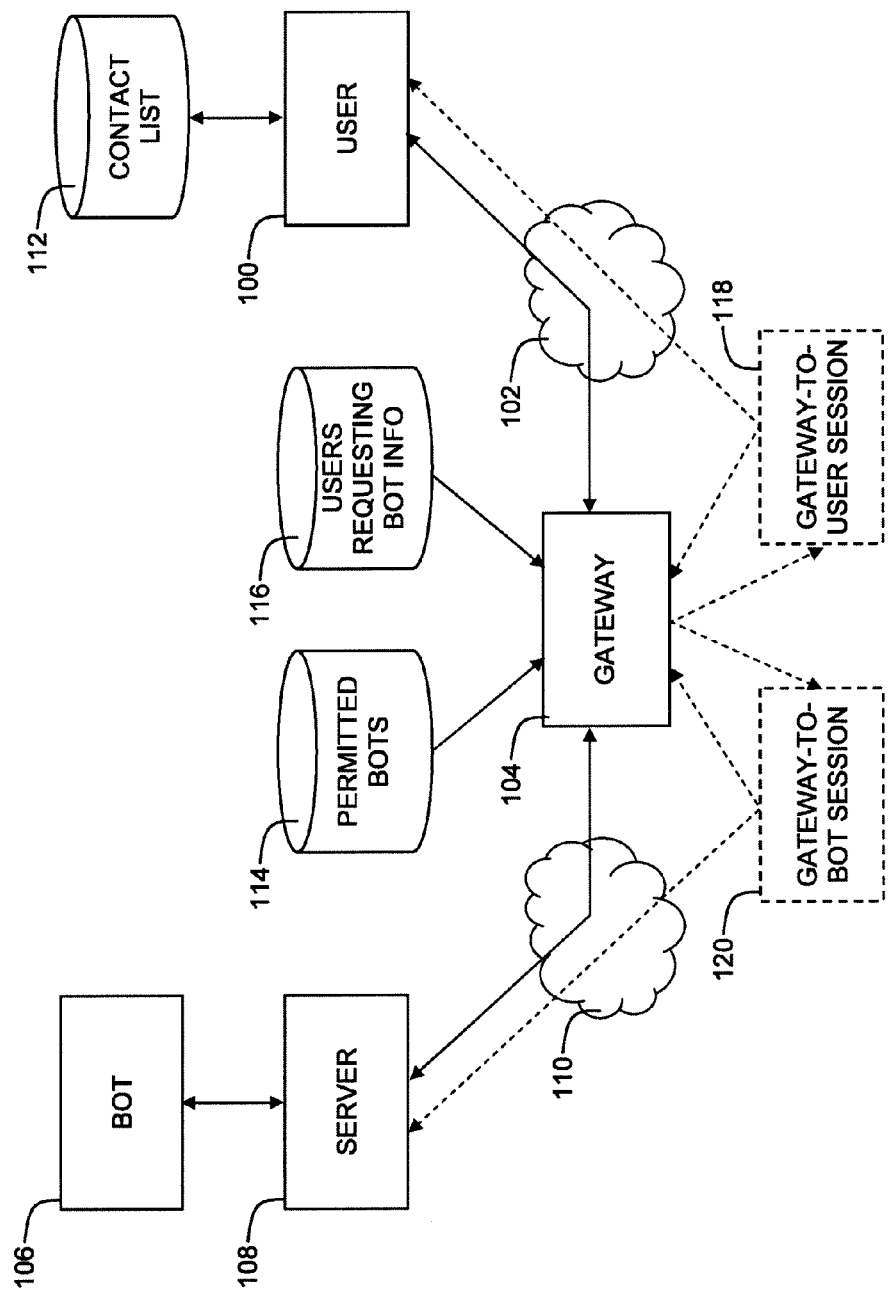
FIG. 1 is a simplified conceptual illustration of a system for managing the use of public BOTs by private computer network users, constructed and operative in accordance with an embodiment of the invention.

The invention is now described within the context of one or more embodiments, although the description is intended to be illustrative of the invention as a whole, and is not to be construed as limiting the invention to the embodiments shown. It is appreciated that various modifications may occur to those skilled in the art that, while not specifically shown herein, are nevertheless within the true spirit and scope of the invention.

As will be appreciated by one skilled in the art, the invention may be embodied as a system, method or computer program product. Accordingly, the invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to any physically tangible device that operates using electronic, magnetic, optical, electromagnetic, or semiconductor physical components. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any physically tangible medium that can contain, store, communicate, propagate, or transport the program for use by or in connection with the instruction execution system, apparatus, or device.

Computer program code for carrying out operations of the invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Reference is now made to FIG. 1, which is a simplified conceptual illustration of a system for managing the use of public BOTs by private computer network users, constructed and operative in accordance with an embodiment of the invention. In the system of FIG. 1 a computer user at a computer 100 (now referred to as user 100) in a first computer network 102, such as a company private computer network, notifies a gateway 104 that user 100 wishes to receive presence information regarding a public BOT 106 that is accessible at a computer server 108 via a second computer network 110, such as the Internet. User 100 may provide the notification to gateway 104 using any conventional technique, such as by adding BOT 106 to an IM contact list 112 that is associated with user 100, whereupon the addition is made known to gateway 104.

Gateway 104 sends a subscription request on behalf of user 100 to server 108 requesting that a subscription be established for presence information regarding BOT 106. Preferably, gateway 104 maintains a list 114 of permitted BOTs, and only sends the subscription request if BOT 106 is found within list 114. Preferably, the subscription request is sent in a manner that prevents BOT 106 from associating the subscription request with user 100, such as where the subscription request does not include information identifying user 100. In one embodiment gateway 104 generates fictitious user information representing a fictitious user other than user 100 and who is not known to gateway 104, and indicates in the subscription request that the subscription is for the fictitious user. In one embodiment, rather than sending a subscription requests in response to a user request for BOT presence information, gateway 104 sends a subscription requests for each BOT in list 114 independent from a user request for BOT presence information, such as at startup of gateway 104.

Gateway 104 preferably maintains a list 116 of users in network 102 who have asked to receive presence information regarding public BOTs. Thus, when gateway 104 receives presence information from server 108 regarding BOT 106, gateway 104 preferably forwards the presence information to user 100 and any other users in list 116 who have asked to receive presence information regarding BOT 106.

When user 100 notifies gateway 104 that user 100 wishes to communicate with BOT 106, gateway 104 preferably establishes a communications session 118, such as a chat session, with user 100, as well as a separate communications session 120 with BOT 106, such as via server 108, in a manner that prevents BOT 106 from associating communications session 120 with user 100, such as described above. Communications received from user 100 by gateway 104 via session 118 are forwarded to BOT 106 via session 120 without information identifying user 100, and communications received from BOT 106 by gateway 104 via session 120 are then forwarded to user 100 via session 118. Where communications with BOT 106 require a separate subscription with BOT 106 for each communications session between a computer user and BOT 106 via gateway 104, gateway 104 preferably sends a subscription request to server 108 for the communications session with BOT 106 in a manner that prevents BOT 106 from associating the request with user 100, such as described above. Gateway 104 associates the subscription with the communications session, and preferably cancels the subscription when the communications session is terminated.

Figure 2:
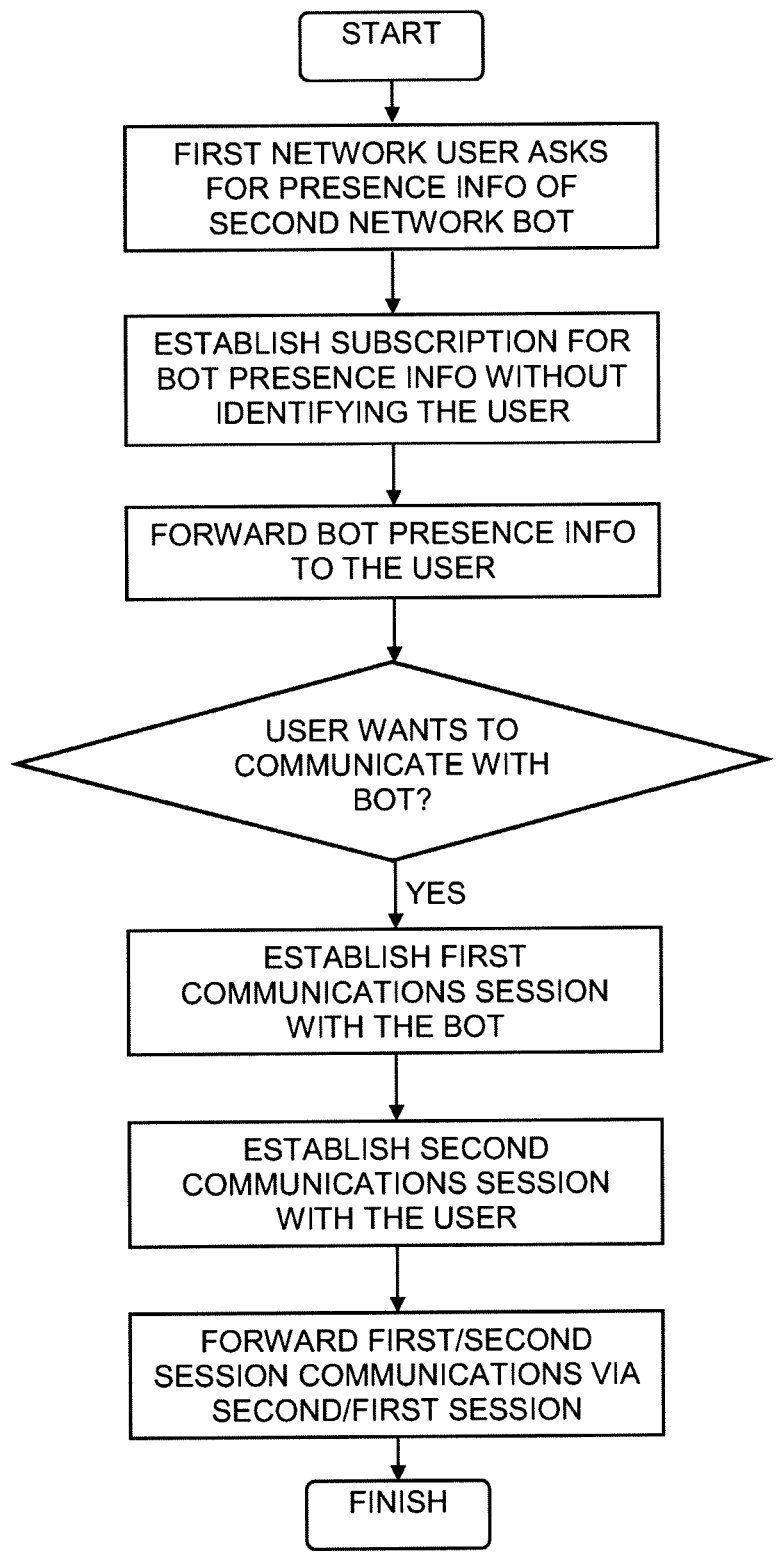
FIG. 2 is a simplified flowchart illustration of an exemplary method of operation of the system of FIG. 1, operative in accordance with an embodiment of the invention.

Reference is now made to FIG. 2, which is a simplified flowchart illustration of an exemplary method of operation of the system of FIG. 1, operative in accordance with an embodiment of the invention. In the method of FIG. 2 a computer user in a first computer network asks to receive presence information regarding a public BOT that is accessible via a second computer network. A subscription is established for presence information regarding the BOT, where the subscription does not identify the user, but instead identifies a fictitious user. Published presence information regarding the BOT is forwarded to the user. When the user wishes to communicate with the BOT, a first communications session is established with the BOT, and a second communications session is established with the user. Communications received from the user via the second communications session are forwarded to the BOT via the first communications session, and communications received from the BOT via the first communications session are forwarded to the user via the second communications session.

Figure 3:
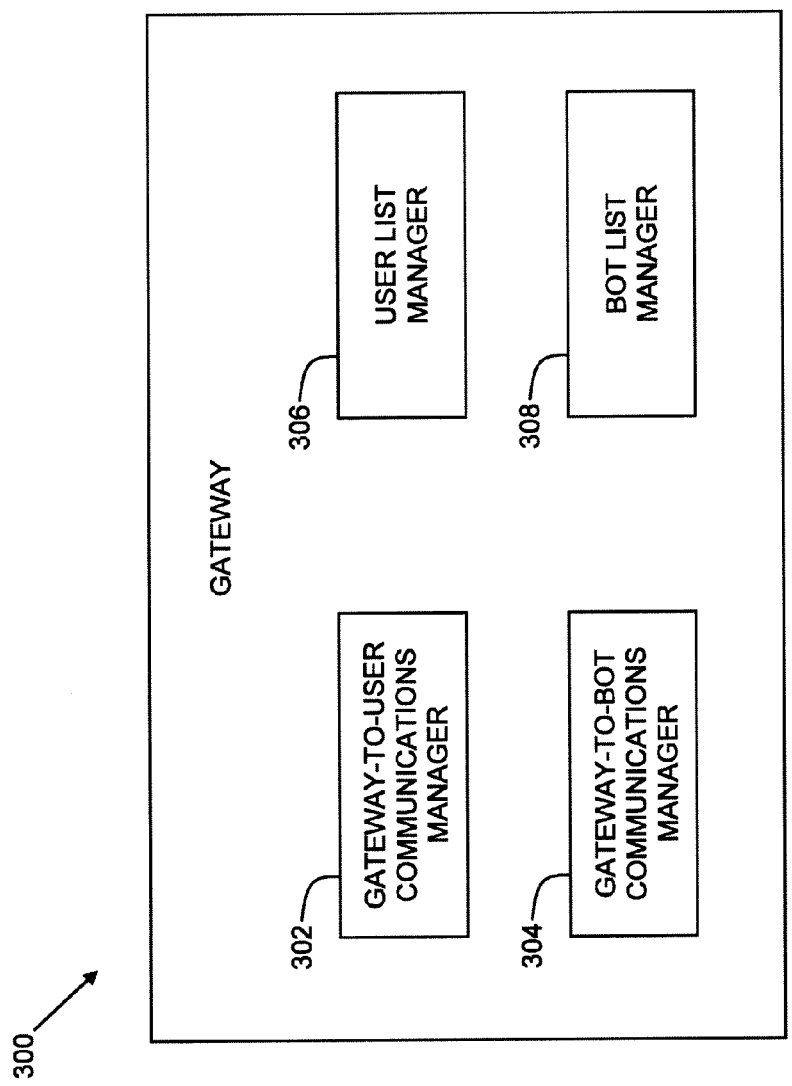
FIG. 3 is a simplified block diagram of a gateway in a system for managing the use of public BOTs by private computer network users, constructed and operative in accordance with an embodiment of the invention.

Reference is now made to FIG. 3, which is a simplified block diagram of a gateway in a system for managing the use of public BOTs by private computer network users, constructed and operative in accordance with an embodiment of the invention. In FIG. 3 a gateway 300, such as may be employed as gateway 104 of FIG. 1, includes a gateway-to-user communications manager 302 for managing communications with computer users, such as for receiving requests for presence information regarding public BOTs, forwarding such presence information to computer users, and for conveying communications to and from computer users via gateway-to-user communications sessions such as communications session 118 of FIG. 1. A gateway-to-BOT communications manager 304 is shown for managing communications with and about BOTs, such as for forwarding requests for presence information regarding public BOTs, and for conveying communications to and from BOTs or BOT servers via gateway-to-BOT communications sessions such as communications session 120 of FIG. 1. A user list manager 306 is shown for maintaining a list of real and fictitious computer users that are to receive BOT presence information and that wish to communicate with BOTs. A BOT list manager 308 is shown for maintaining a list of permitted BOTs about which computer users served by gateway 300 may receive information and with which those computer users may communicate via gateway 300.

It will be appreciated that any aspect of the invention described hereinabove may be implemented as a computer program product embodied in a computer-readable medium, such as in the form of computer program instructions stored on magnetic or optical storage media or embedded within computer hardware, and may be executed by or otherwise be made accessible to a computer.

It will be appreciated that the invention provides improvements over the prior art in that it allows computer users in a private computer network to communicate anonymously with public BOTs that are accessible via public computer networks. Thus, a BOT that attempts to initiate a chat sessions with a previous user of the BOT with not be able to communicate directly with the user, as the BOT never receives information identifying the user, and any such attempts may be intercepted by an intermediate gateway and ignored. Furthermore, the invention does not require that the intermediate gateway maintain separate subscriptions for each private computer network user who wishes to receive presence information regarding the BOT.

Figure 4:
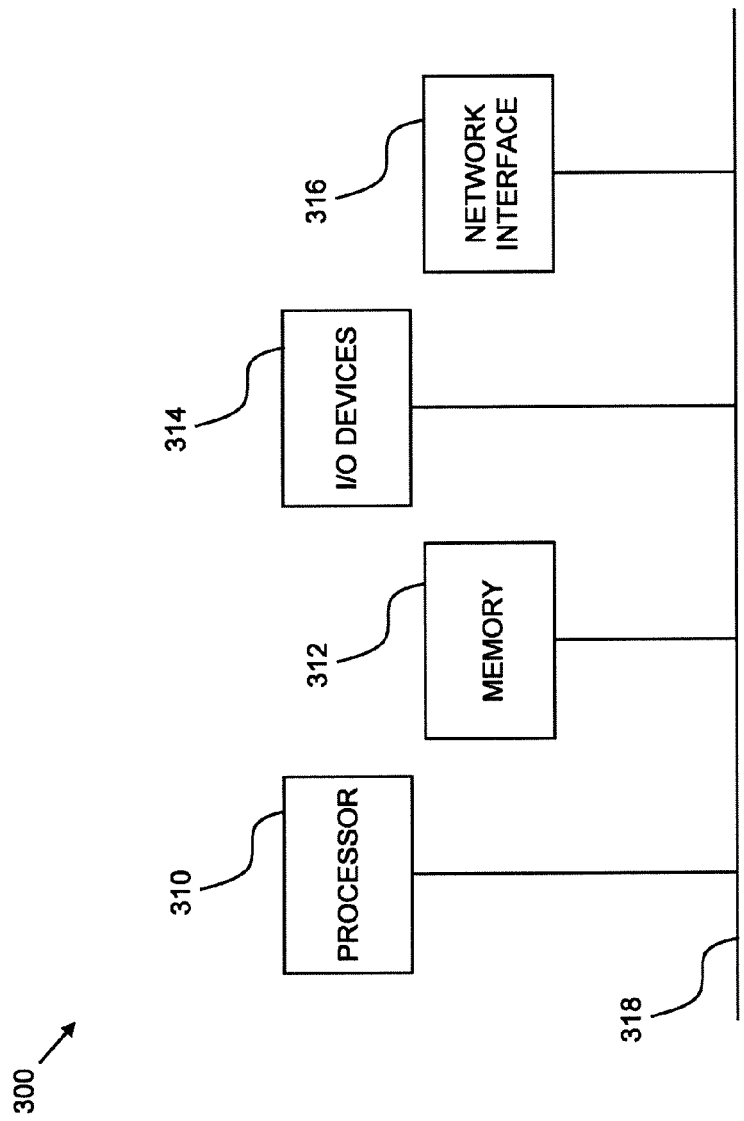
FIG. 4 is a simplified block diagram illustration of an exemplary hardware implementation of an embodiment of the invention.

Referring now to FIG. 4, block diagram 400 illustrates an exemplary hardware implementation of a computing system in accordance with which one or more components/methodologies of the invention (e.g., components/methodologies described in the context of FIGS. 1-3) may be implemented, according to an embodiment of the invention.

As shown, the techniques for controlling access to at least one resource may be implemented in accordance with a processor 410, a memory 412, I/O devices 414, and a network interface 416, coupled via a computer bus 418 or alternate connection arrangement.

It is to be appreciated that the term "processor" as used herein is intended to include any processing device, such as, for example, one that includes a CPU (central processing unit) and/or other processing circuitry. It is also to be understood that the teiin "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc. Such memory may be considered a computer readable storage medium.

In addition, the phrase "input/output devices" or "I/O devices" as used herein is intended to include, for example, one or more input devices (e.g., keyboard, mouse, scanner, etc.) for entering data to the processing unit, and/or one or more output devices (e.g., speaker, display, printer, etc.) for presenting results associated with the processing unit.

The flowchart and block diagrams in the Figures illustrate the architecture, functionality, and operation of possible implementations of systems, methods and computer program products according to various embodiments of the invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the methods and apparatus herein may or may not have been described with reference to specific computer hardware or software, it is appreciated that the methods and apparatus described herein may be readily implemented in computer hardware or software using conventional techniques.

While the invention has been described with reference to one or more specific embodiments, the description is intended to be illustrative of the invention as a whole and is not to be construed as limiting the invention to the embodiments shown. It is appreciated that various modifications may occur to those skilled in the art that, while not specifically shown herein, are nevertheless within the true spirit and scope of the invention.

What is claimed is:

1. A computer-implemented method for managing the use of computer services by computer users comprising:
   receiving at a network device associated with one or more real computer users a request from a real computer user associated with the network device;
   determining a fictitious user other than the one or more real computer users and generating information associated with the fictitious user;
   sending a communication from the network device to a computer service on behalf of the real computer user providing the request using the information associated with the fictitious user, wherein the communication is identified as originating from the fictitious user and prevents the computer service from associating the communication with the real computer user providing the request; and
   receiving at the network device a communication for the fictitious user that originates from the computer service and sending the communication to the real computer user providing the request.

2. The computer-implemented method of claim 1, wherein the computer service includes a public robot (BOT).

3. The computer-implemented method of claim 2, wherein the network device includes a gateway that sends the communication to the public robot (BOT) on behalf of the real computer user and sends the communication that originates from the public robot (BOT) to the real computer user.

4. The computer-implemented method of claim 1, wherein sending a communication to a computer service comprises sending a subscription request on behalf of the real computer user requesting that a subscription be established for presence information regarding the computer service.

5. The computer-implemented method of claim 4, further comprising:
   receiving presence information regarding the computer service in connection with the subscription request; and
   sending the presence information to the real computer user.

6. A system for managing the use of computer services by computer users comprising:
   a network device associated with one or more real computer users and including at least one processor configured to:
      receive a request from a real computer user associated with the network device;
      determine a fictitious user other than the one or more real computer users and generate information associated with the fictitious user;
      send a communication to a computer service on behalf of the real computer user providing the request using the information associated with the fictitious user, wherein the communication is identified as originating from the fictitious user and prevents the computer service from associating the communication with the real computer user providing the request; and
      receive a communication for the fictitious user that originates from the computer service and send the communication to the real computer user providing the request.

7. The system of claim 6, wherein the computer service includes a public robot (BOT).

8. The system of claim 7, wherein the network device includes a gateway.

9. The system of claim 6, wherein sending a communication to a computer service comprises sending a subscription request on behalf of the real computer user requesting that a subscription be established for presence information regarding the computer service.

10. The system of claim 9, wherein the at least one processor is further configured to:
    receive presence information regarding the computer service in connection with the subscription request; and
    send the presence information to the real computer user.

11. A computer program product for managing the use of computer services by computer users comprising:
    a computer readable storage device having computer readable program code embodied therewith, the computer readable program code comprising computer readable program code configured to:
       receive at a network device associated with one or more real computer users a request from a real computer user associated with the network device;
       determine a fictitious user other than the one or more real computer users and generating information associated with the fictitious user;
       send a communication from the network device to a computer service on behalf of the real computer user providing the request using the information associated with the fictitious user, wherein the communication is identified as originating from the fictitious user and prevents the computer service from associating the communication with the real computer user providing the request; and
       receive at the network device a communication for the fictitious user that originates from the computer service and send the communication to the real computer user providing the request.

12. The computer program product of claim 11, wherein the computer service includes a public robot (BOT).

13. The computer program product of claim 12, wherein the computer readable program code is configured to execute within a gateway.

14. The computer program product of claim 11, wherein sending a communication to a computer service comprises sending a subscription request on behalf of the real computer user requesting that a subscription be established for presence information regarding the computer service.

15. The computer program product of claim 14, wherein the computer readable program code further comprises computer readable program code configured to:
    receive presence information regarding the computer service in connection with the subscription request; and
    send the presence information to the real computer user.

* * * * *